May 2, 1961 J. W. KLINKENBERG 2,982,799
CATALYTIC CONVERSION OF HYDROCARBONS
Filed March 24, 1959
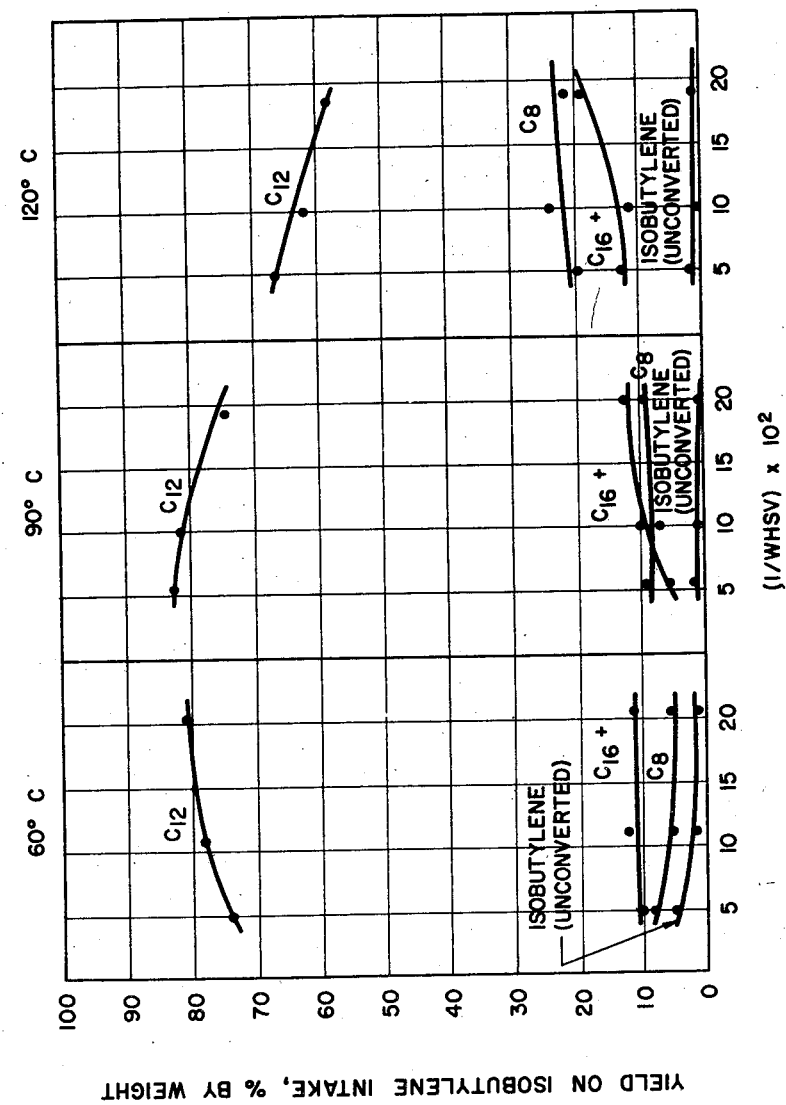
INVENTOR:
JAN W. KLINKENBERG
BY: John H. Colvin
HIS ATTORNEY

United States Patent Office 2,982,799
Patented May 2, 1961

2,982,799

CATALYTIC CONVERSION OF HYDROCARBONS

Jan W. Klinkenberg, Amsterdam, Netherlands, assignor to Shell Oil Company, a corporation of Delaware Filed Mar. 24, 1959, Ser. No. 801,614

Claims priority, application Netherlands Apr. 28, 1958

6 Claims. (Cl. 260—683.15)

This invention relates to an improved process and catalyst for the conversion of normally gaseous hydrocarbons to normally liquid hydrocarbons suitable for use as a motor fuel. More particularly the invention relates to an improved process wherein normally gaseous branched olefins are converted into liquid polymers by means of specially prepared catalysts.

It has been known to polymerize normally gaseous branched olefins such as isobutylene with catalysts such as sulfuric acid, phosphoric acid, heteropoly acids or salts of heteropoly acids, boron fluoride, metallic halides such as aluminum chloride, and double salts containing aluminum chloride such as barium, sodium, calcium, or lithium chloroaluminate. The most commonly used catalysts are sulfuric and phosphoric acid. It has also been known that under suitable conditions isobutylene can be polymerized with other olefins such as normal butylenes to produce higher boiling copolymers.

An object of the present invention is to provide a new and improved process for the polymerization of a normally gaseous branched olefin. A further object is to provide an improved process and catalyst for the selective polymerization of a normally gaseous branched olefin while in a mixture with normally gaseous unbranched olefins. Still another object of the invention is to provide an improved process for the polymerization of iso- butylene in the presence of an improved heteropoly acid catalyst. These and other objects of the invention will be readily apparent from the description and discussion of the invention which is made with the aid of the accompanying drawing, wherein yield structures are shown for polymerization of isobutylene.

It has now been discovered that at temperatures in the range of from about 20° C. to about 200° C. isobutylene can be polymerized by means of specially prepared heteropoly acid catalysts. Furthermore, the isobutylene polymerizes so much more readily than unbranched butylenes that a suitable selection of conditions enables isobutylene to be polymerized selectively, the unbranched butylenes remaining entirely or substantially monomeric. Moreover, the isobutylene is polymerized to higher boiling branched chain olefins and not to aromatic hydrocarbons.

The catalyst of the invention is a specially prepared catalyst consisting of a heteropoly acid deposited in small amounts on a solid carrier which is esesntially alkaline free.

Suitable heteropoly acids are described in some detail in "Modern Aspects of Inorganic Chemistry" by H. J. Emeleus et al., second edition (1952), pp. 207–209. These heteropoly acids are ether soluble compounds formed by the union of varying numbers of inorganic acid anhydride molecules—preferably $WO_3$, $MO_3$, or $V_2O_5$—with a second inorganic acid which is regarded as furnishing the central atom or central ion of the complex ion. Of particular importance are the 6-poly and 12-poly acids wherein the acid anhydride is combined with the parent acid in a molecular ratio of 6 and 12, respectively. The 12-poly acids are especially preferred.

The heteropoly acids are well known and have been found to be suitable catalysts for various hydrocarbon conversion processes such as hydroforming, cracking, hydrogenation, dehydrogenation, desulfurization, aromatization, alkylation, polymerization, isomerization, dehydrochlorination, and addition reactions (addition of hydrogen, halogens, hydrogen halides, water, and other substances to unsaturated hydrocarbon bonds). The salts of heteropoly acids are generally suitable for such hydrocarbon conversion processes as well.

The heteropoly acids or their salts are suitable catalysts when used either in the absence of a carrier or when supported on a carrier. For many conversion processes, heteropoly acids supported on a carrier are usually found to be equally and in some instances more effective than the heteropoly acid alone. When a carrier is used the heteropoly acid content varies according to the particular cnoversion process, but in general it is in excess of 10% by weight, based on the total catalyst. Carriers are used where possible since many materials suitable as carriers are considerably cheaper than the heteropoly acids.

There are many materials such as diatomaceous earth, pumice, metal oxides, clays, carbon, gels, and the like which can be used as a support for active catalytic agents. The particular choice of a carrier depends upon many factors, e.g. surface area, density, porosity, particle size, specific heat, heat stability, and mechanical strength. Most carrier materials, and the naturally occurring materials in particular, are generally pretreated by washing, grinding, acid treating, calcining, or other means to remove impurities or to improve physical characteristics of the material.

Carriers suitable for the catalyst of the present invention are, for example, silica gel, natural and synthetic alumina, mixed gels comprising $SiO_2$ and $Al_2O_3$, aluminum silicate, and pumice. The preferred carriers are silica gel and mixed gels of which the dry matter comprises mainly, i.e. more than 50% by weight, free and/or bound $SiO_2$ and mnior amounts of $Al_2O_3$. Examples of mixed gels are the commercial silica-alumina cracking catalysts. The expression "gel" is used to designate both the fresh, water-containing gels proper and the products obtained by drying (activating) these gels.

In the catalyst of the invention, heteropoly acids can be used in amounts smaller than has been usual with gels consisting substantially of $SiO_2$ as a carrier. It has now been found that catalysts which are highly active in hydrocarbon conversion processes, and selective polymerization of isobutylene in particular, can be obtained by depositing a heteropoly acid in concentrations as low as from about 0.5% to about 8% by weight, based on the total weight of the dry catalyst, on a gel carrier provided the carrier contains less than 1 milliequivalent of alkali per 100 grams. Moreover, the catalysts produced according to the invention are more active than those in which heteropoly acids are supported on other carriers in the same concentrations.

Examples of heteropoly acids suitable for the practice of the invention are phospho-tungstic acid, phospho-molybdic acid, chromo-molybdic acid, phospho-tungstic-molybdic acid, phospho-vanadic acid, silico-tungstic acid, silico-molybdic acid, arseno-molybdic acid, and boro-tungstic acid. Heteropoly acids derived from tungsten are preferably used.

The presence of alkali in a carrier material is undesirable when the carrier itself has catalytic properties which are adversely affected by alkali. Heteropoly acids react easily with alkali. Therefore, when a heteropoly acid is used as the active catalytic agent, any alkali present in the carrier would be considered to have formed the corresponding salt with the heteropoly acid. Formation of the salt would not be expected to be detrimental to catalytic properties because according to the prior art alkali salts of the heteropoly acids are considered to be equivalent to the heteropoly acids as catalytic agents for polymerization and the like. Thus, an amount of alkali in the carrier sufficient to neutralize half of a heteropoly acid would be expected to have no adverse affect on the catalytic properties. If, for example, silico-tungstic acid is half neutralized with sodium oxide, an acid salt is formed having a sodium content of 1.6% by weight. Such a half-neutralized silico-tungstic acid supported on a carrier in a concentration of 2.5% by weight would result in a sodium content of 0.04% w. in the total catalyst. However, contrary to what would be expected, it has been found that the activity of a catalyst containing 2.5% by weight of silico-tungstic acid supported on a silica gel carrier containing 0.04% by weight sodium is reduced to 25% of its normal activity. Furthermore, a sodium content of 0.05% by weight in the carrier, equivalent to neutralizing about 63% of the silico-tungstic acid, entirely deactivated the catalyst.

The important discovery is that highly active catalysts can be obtained by depositing on a gel as carrier one or more heteropoly acids in a concentration in the range of from about 0.5% to about 8% by weight, particularly from about 1% to about 4% by weight, based on the total dried catalyst, provided the alkali content of the gel in a dried state is below 1 milliequivalent per 100 grams. An alkali content of 1 milliequivalent only slightly reduces the activity of the catalyst. Since it has also been found that an alkali content of 0.6 milliequivalent has only a very slight adverse affect on the catalyst activity, it is preferred to use a gel having an alkali content below 0.6 milliequivalent per 100 grams (in a dried state). Alkali also includes ammonium.

The content of alkali compounds in silica gel may be reduced as required by leaching with dilute mineral acids such as hydrochloric acid or sulfuric acid of 3 N to 4 N concentration. After this treatment the acid is removed by water washing. If desired, the gel can then be dried. At times it may be desirable to treat the gel with acid, calcine the gel, and then treat the calcined gel with acid.

Ammonium compounds may also be removed by heating. A very effective procedure is to heat the gel for some time (usually several hours) at elevated temperature (for example from 500° to 750° C.) with air or another oxygen-containing gas, preferably together with water vapor (for example 3 to 10% by volume of water vapor, based on the gaseous mixture). In certain cases an inert gas can be used instead of an oxygen containing gas.

The gel may be impregnated with heteropoly acids by any of the known methods. According to one such method the gel is immersed in a heteropoly acid solution and after it has adsorbed the heteropoly acid it is separated from the solution by filtering or centrifuging. It is also possible to evaporate to dryness a mixture of silica gel and a solution of the heteropoly acid, the mixture being stirred occasionally. In a third method a solution of the heteropoly acid is added to the gel, with stirring, in a quantity which is completely adsorbed by the gel. To promote a uniform distribution the largest possible quantity of the solution which may be adsorbed by the gel is used in this case. In this method the required heteropoly acid concentration in the solution is determined by the desired percentage of heteropoly acid in the catalyst and by the adsorption capacity of the gel.

The catalyst is subsequently made ready for use by heating it to a temperature in the range of from 110 to 300° C. in air or an inert gas, preferably in a stream of such a gas. This heating period generally varies between approximately 1 hour and approximately 24 hours. A shorter heating period is required with increasing temperature.

In some cases the heteropoly acid is supported on the gel by using a compound from which the heteropoly acid is formed on heating instead of a solution of the heteropoly acid. Examples of such compounds are complexes of heteropoly acids with ethers.

The catalysts according to the invention can be employed in various forms and particle sizes. Either the powder form (for example particle sizes from 0.01 to 0.2 mm.) may be used or a distribution into coarser particles or pellets.

The catalysts of the present invention are illustrated by the following examples.

EXAMPLE I

*Silico-tungstic acid supported on silica gel*

The starting material was a commercial silica gel, prepared from sodium silicate, which was ammonia free and had the following properties:

Na content_____ 0.49% by weight.
Surface area_____ 646 sq. m./g.
Pore volume_____ 0.48 ml./g. (B.E.T. method).

A 500 gram portion of this gel was stirred at 20° C. for 3 hours with 2 liters of 4 N HCl. The product was then filtered and water-washed until no chloride ions could be identified. After drying in an air stream at 150° C. for 8 hours the properties of the gel were found to be as follows:

Na content_____ 0.01% by weight.
Surface area_____ 677 sq. m./g.
Pore volume_____ 0.53 ml./g.

To the dry treated gel was added a solution of 12.9 g. of silico-tungstic acid in sufficient water to immerse the gel completely. The mixture was stirred occasionally while evaporating the water over a steam bath. The remaining water was removed by heating the gel in an air stream at 180° C. for 8 hours.

When a mixture comprising 80.7% by volume of n-butane and 19.3% by volume of isobutylene was passed over the resulting dried catalyst at atmospheric pressure, a temperature of 40° C. and a space velocity (L.H.S.V.) of 5 liters per hour per liter of catalyst volume, 100% of the isobutylene was polymerized.

For comparison, a catalyst was prepared in which twice as much silico-tungstic acid (5.02% by weight, based on the total catalyst) was deposited on a silica gel in which the sodium content had been reduced to only 0.17% by weight. With this catalyst only 49.4% of the isobutylene in the above mixture was polymerized at 1 atmosphere, 40° C. and an L.H.S.V. of 5

EXAMPLE II

*Silico-tungstic acid supported on silica-alumina*

The starting material was a fresh gel of a silica-alumina complex in which the weight ratio of $SiO_2$ to $Al_2O_3$ was 88:12. Sodium had been removed from this gel by treating with ammonium nitrate.

A mixture comprising 95% by volume of air and 5% by volume of water vapor was passed over 500 grams of the above fresh silica-alumina gel for 10 hours at 650° C.

and at a space velocity of 30 liters per hour per liter of catalyst volume. Properties of the gel before and after treatment were as follows:

|  | Before calcination with moist air | After calcination with moist air |
|---|---|---|
| NH$_3$ content, percent by weight | 0.90 | 0.00 |
| Surface area, sq. m./g | 651 | 467 |
| Pore volume, ml./g | 0.70 | 0.60 |

To the gel thus treated was added a solution of 26 g. of silico-tungstic acid in sufficient water to immerse the gel completely. The water was evaporated over a steam bath while the mixture was stirred occasionally. The remaining water was removed by heating in an air stream at 180° C. for 8 hours.

A mixture of n-butane and isobutylene of the same composition as in Example I was passed over this catalyst under the same conditions as in Example I. The conversion of isobutylene was 100%.

In a comparative experiment the calcination in moist air was omitted and the content of silico-tungstic acid in the catalyst was doubled. When the mixture of n-butane and isobutylene was passed over this catalyst under the same conditions as in Example I, only 3.2% of the isobutylene was converted.

EXAMPLE III

*Phospho-tungstic acid supported on silica-alumina*

The starting material was the fresh silica-alumina complex of Example II. A 500 gram portion of this silica-alumina complex was stirred for 3 hours at 20° C. with a 4 N HCl solution and then filtered out and water-washed until no further chloride ions could be identified. After drying the gel for 8 hours in an air stream at 150° C., properties of the gel were found to have changed as follows:

|  | Before HCl treatment | After HCl treatment |
|---|---|---|
| NH$_3$ content, percent by weight | 0.90 | 0.00 |
| Surface area, sq. m./g | 651 | 894 |
| Pore volume, ml./g | 0.70 | 0.69 |

To the dry gel were added 5.5 g. of phospho-tungstic acid in sufficient water to immerse the gel completely. The water was evaporated over a steam bath while the mixture was stirred occasionally. The remaining water was removed by heating in an air stream at 180° C. for 8 hours.

When this catalyst was used with a mixture of n-butane and isobutylene of the same composition and under the same conditions as in Examples I and II, an isobutylene conversion of 91.8% was obtained.

It has also been found that the catalysts are particularly effective for the polymerization of isobutylene to higher boiling hydrocarbons such as di- and tri-isobutylene (dimer and trimer, resp.) at temperatures in the range from about 20° to about 200° C. and space velocities in the range of from about 1 to about 40 l./l. h. In addition, the catalysts of the invention are suitable for various hydrocarbon conversion processes such as hydroforming, hydrocracking, hydrogenation, dehydrogenation, desulfurization, isomerization, aromatization, alkylation, and addition reactions.

Space velocity may be expressed either as liquid hourly space velocity or weight hourly space velocity. Liquid hourly space velocity (L.H.S.V.) is defined as the quantity of butylenes (calculated in liters of liquid butylenes) or as the quantity of butylenes and butanes (calculated in liters of liquid butylenes and butanes) per liter of catalyst volume per hour. Weight hourly space velocity (W.H.S.V.) is defined as the quantity of butylenes (calculated in kilograms) or as the quantity of butylenes and butanes (calculated in kilograms of butylenes and butanes) per kilogram of catalyst weight per hour. In this specification the unit by which space velocity is expressed is abbreviated as l./l. h. and kg./kg. h. for liquid and weight hourly space velocity, respectively.

The required contact time for butylene with the catalysts of the invention is determined both by the temperature and the activity of the catalyst and may readily be found for each particular case by varying the space velocity. The activity of the catalyst depends on the nature of the heteropoly acid, the nature of the carrier, the ratio in which the heteropoly acid and the carrier are present, their degree of purity, and the manner in which the heteropoly acid and carrier, as well as the catalyst as a whole, are pre-treated and prepared.

The influence of process variables on the conversion of isobutylene and the relative proportions of polymers produced were determined by experiments carried out in a continuous-flow stirred-reactor system. The catalyst used was 5% by weight of silico-tungstic acid deposited on a commercial silica-alumina cracking catalyst. The cracking catalyst had been treated with 4 N HCl as described previously to provide an alkali content less than 1 m. eq. of sodium per 100 grams of dry catalyst. Feed for these experiments consisted of a mixture containing 24% by weight isobutylene and 76% by weight isobutane. Space velocity is calculated on the basis of total feed (isobutylene plus isobutane).

Results of the experiments, illustrated in the accompanying drawing, show that nearly complete conversion of isobutylene is obtained, particularly at the higher temperatures. Lower temperatures favor the yield of trimer ($C_{12}$). Dimer ($C_8$) yield increases with increasing temperature, however, at the higher temperatures considerable amounts of polymer bottoms (tetramer) are formed also. The formation of tetramer ($C_{16}$) can be suppressed to a certain extent by applying high space velocities. No aromatic hydrocarbons were produced and only very small amounts of components with a number of carbon atoms not being a multiple of 4 were found.

Since both the dimer and trimer boil within the boiling range for motor gasoline and have an F-1-1½ octane number (Research Method octane rating after the addition of 1½ cc. T.E.L. per gallon) of over 100, they are suitable, either as such or after hydrogenation, as motor gasoline components. The trimer is primarily a mixture of 2,6,6-tetramethyl-4-methylene-heptane and 2,2,4,6,6-pentamethyl-3-heptene. This mixture of trimers, upon hydrogenation, was converted into 2,2,4,6,6-pentamethyl-heptane (boiling point of 351–352° F.) which is especially desirable for use in motor gasoline because its F-1 octane number is 102 unleaded and 111 (Wiese scale) after the addition of 1½ cc. TEL per gallon. Consequently, it is preferred at times to polymerize isobutylene at temperatures within the range of about 40° to about 140° C. and especially about 55° to about 95° C., and space velocities of about 1 to about 50 kg./kg. h. with space velocities of about 5 to about 20 kg./kg. h. particularly preferred. The dimer, when hydrogenated, is practically pure isooctane which is suitable for use in motor gasoline and particularly aviation gasoline. The polymers can be hydrogenated by any of the known methods for hydrogenating butylene polymer. Hydrogenation methods employing tungsten nickel sulfide or cobalt molybdenum oxide catalysts are particularly suitable.

In another aspect of the invention it has been discovered that not only are the catalysts of the invention highly active for the polymerization of isobutylene but that they are also effective to selectively polymerize isobutylene while mixed with unbranched butylenes. The unbranched butylenes are polymerized little or not at all. According to the invention, a mixture of isobutylene with butylene-1 and/or butylene-2 is contacted at a temperature of from about 20° to about 200° C. with a heteropoly acid catalyst specially prepared as described hereinbefore and for a sufficient period of time to polymerize at least 75% of the isobutylene and not more than 10% of the unbranched butylenes. When the catalyst is silico-tungstic acid supported on very pure silica gel and the concentration of the silico-tungstic acid in the catalyst is in the range of from about 0.5% to about 8% by weight, the liquid hourly space velocity will generally vary from about 1 to about 40 l./l. h. Generally the higher the temperature the higher the space velocity will be. The preferred temperature range is from about 40° to about 140° C. and the preferred space velocity is from about 4 to about 20 l./l. h.

In this specification the term "isobutylene" refers to the compound

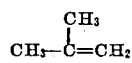

"butylene-1" refers to the compound

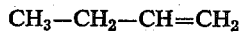

and "butylene-2" refers to the compound

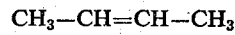

either the cis or the trans isomer or a mixture thereof.

The selective polymerization of isobutylene in mixtures with unbranched butylenes is illustrated by the following examples.

EXAMPLE IV

The catalyst used was silicon-tungstic acid supported on silica gel as carrier and was prepared as follows.

The silica gel was washed with 3 N HCl until the sodium content had been reduced to below 0.02% by weight, based on the gel in a dry state. The hydrochloric acid was removed by water washing, after which the gel was dried in an air stream for 8 hours at 150 C. The gel was then impregnated with a solution of silico-tungstic acid and the catalyst prepared for use by drying in an air stream for 8 hours at 180° C. The quantity of silico-tungstic acid was 5% by weight, based on the total catalyst.

A liquid mixture comprising 25% by volume of butylene-2, 25% by volume of isobutylene and 50% by volume of isobutane was passed over this catalyst at 50° C. and at the equilibrium vapor pressure at this temperature. At a liquid hourly space velocity of 10 l./l. h., 85% of the isobutylene was polymerized, but none of the butylene-2 was polymerized.

When the polymer is recovered and hydrogenated, a high octane gasoline is obtained. Moreover, high octane alkylate is obtained when the butylene-2 separated from the polymer is alkylated with isobutane. Both the hydrogenated polymer and the alkylate are excellent components for blending into high octane gasoline. The alkylate is especially preferred for blending into high quality aviation gasoline. Suitable hydrogenation and alkylation processes are well known in the art and do not require detailed discussion in this specification. Hydrogenation processes using cobalt molybdenum oxide or tungsten nickel sulfide catalysts and alkylation processes using concentrated sulfuric or hydrofluoric acid catalysts are preferred.

EXAMPLE V

The experiment of Example IV was repeated, the conditions being varied only in the following respects. The quantity of silico-tungstic acid was 2.5% fy weight of the total catalyst and the liquid hourly space velocity was 15 l./l. h.

In this experiment 76% of the isobutylene was polymerized but again none of the butylene-2 was polymerized.

EXAMPLE VI

A carrier selected for the heteropoly acid was a commercial cracking catalyst obtained from a mixed gel of silicic acid and aluminum hydroxide. The ratio by weight of $SiO_2$ to $Al_2O_3$ was 88:12. A 500 gram amount of this cracking catalyst was treated for 3 hours at 20° C. with 2 liters of 3 N HCl, with stirring, and then water-washed until no further HCl could be identified. As a result of the HCl treatment the alkali content (including ammonium) was reduced to less than 1 milliequivalent per 100 grams, based on the dry matter. The cracking catalyst was then impregnated with an aqueous solution of silico-tungstic acid and dried in an air stream for 8 hours at 18° C. The quantity of silico-tungstic acid was 5% by weight, based on the total catalyst.

A liquid mixture comprising 25% by volume of isobutylene, 25% by volume of butylene-1 and 50% by volume of isobutane was passed over this catalyst at 95° C. and saturation pressure (equilibrium vapor pressure). The following table shows the results at various space velocities.

TABLE I

| L.H.S.V. | Polymerized isobutylene, percent | Polymerized butylene-1, percent | Butylene-2 in percent of the equilibrium value |
|---|---|---|---|
| 15 | 92 | 1 | 68 |
| 20 | 92 | 6 | 60 |

The isobutane was recovered unchanged.

The mixture of unbranched butylenes, from which according to the invention most of the isobutylene has been removed by polymerization, is very suitable for the preparation of butadiene therefrom or for alkylation with other hydrocarbons such as isobutane. It is also important that in the process according to the invention there is also isomerization of butylene-1 into butylene-2. This isomerization is the subject of a copending application, Serial No. 801,433, by Jan W. Klinkenberg and H. H. Voge filed simultaneously with the present application.

It should be appreciated that in the practice of the present invention the butylenes may be either liquid or gaseous. The pressure under which the polymerization reaction is carried out is not critical. Normally any convenient pressure may be used, but the preferred range is from atmospheric to about 1500 pounds per square inch gauge.

Furthermore, isobutylene is polymerized in the process of the invention even in the presence of preponderant amounts of paraffin diluents such as normal or isobutane. The paraffins are not altered by the catalyst. Since polymerization is an exothermic reaction, paraffin diluents are desired at times to make possible a more precise temperature control or to extend catalyst life by helping to avoid catalyst decomposition from localized "hot" spots.

I claim as my invention:

1. A process for the selective polymerization of isobutylene which comprises contacting a mixture of isobutylene and unbranched butylenes with a heteropoly acid supported on a gel as carrier at a temperature of from about 20° to about 200° C. and a liquid hourly space velocity of from about 1 to about 40 l./l. h., said gel being predominantly silica and having an alkali content less than 1 milliequivalent per 100 grams, and said heteropoly acid being derived from tungstic acid and being present in a concentration of from about 0.5% to about 8% by weight, based on the total dried catalyst.

2. A process according to claim 1 wherein said heteropoly acid is silico-tungstic acid.

3. A process according to claim 1 wherein said heteropoly acid is phospho-tungstic acid.

4. A process according to claim 1 wherein said gel is silica gel.

5. A process according to claim 1 wherein said gel is a mixed gel comprising silica and alumina and having at least 50% by weight of silica.

6. A process for the selective polymerization of isobutylene which comprises contacting a mixture of isobutylene and unbranched butylene with a silico-tungstic acid supported on silica gel at a temperature of from about 20° to about 200° C. for a period of time to polymerize at least 75% of the isobutylene and not more than 10% of the unbranched butylenes, said silica having an alkali content less than 1 milliequivalent per 100 grams and said silico-tungstic acid being present in a concentration of from about 0.5% to about 8% by weight, based on the total dried catalyst.

References Cited in the file of this patent
UNITED STATES PATENTS

| | | |
|---|---|---|
| 2,215,876 | Herold et al. | Sept. 24, 1940 |
| 2,237,460 | Thompson | Apr. 8, 1941 |
| 2,301,966 | Michel et al. | Nov. 17, 1942 |
| 2,403,869 | Marschner | July 9, 1946 |
| 2,547,380 | Fleck | Apr. 3, 1951 |
| 2,798,890 | Waterman et al. | July 9, 1957 |